(12) United States Patent
Terashima (10) Patent No.: US 8,842,718 B2
(45) Date of Patent: Sep. 23, 2014

(54) METHOD OF CAPTURING SATELLITE SIGNAL AND DEVICE FOR CAPTURING SATELLITE SIGNAL

(71) Applicant: Seiko Epson Corporation, Shinjuku-ku (JP)

(72) Inventor: Maho Terashima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 75 days.

(21) Appl. No.: 13/737,845

(22) Filed: Jan. 9, 2013

(65) Prior Publication Data

US 2013/0177045 A1  Jul. 11, 2013

(30) Foreign Application Priority Data

Jan. 11, 2012 (JP) ................................ 2012-002803

(51) Int. Cl.
*H04B 1/69* (2011.01)
*G01S 19/30* (2010.01)
*H04B 1/709* (2011.01)

(52) U.S. Cl.
CPC ............... *H04B 1/709* (2013.01); *G01S 19/30* (2013.01)
USPC ........... 375/150; 375/260; 370/329; 370/331; 370/252

(58) Field of Classification Search
USPC .................. 375/150, 260; 370/329, 331, 252
See application file for complete search history.

(56) References Cited

U.S. PATENT DOCUMENTS

| | | | |
|---|---|---|---|
| 3,701,894 A | 10/1972 | Low et al. | |
| 6,377,683 B1 | 4/2002 | Dobson et al. | |
| 6,888,879 B1 | 5/2005 | Lennen | |
| 7,110,442 B2 | 9/2006 | Lennen | |
| 2006/0056497 A1 | 3/2006 | Lennen | |
| 2010/0254492 A1 | 10/2010 | Chen | |
| 2014/0071928 A1* | 3/2014 | Papasakellariou et al. | ... 370/329 |
| 2014/0092764 A1* | 4/2014 | Ogawa | ........................... 370/252 |
| 2014/0098788 A1* | 4/2014 | Uemura et al. | ................ 370/331 |
| 2014/0119308 A1* | 5/2014 | Mochida | ....................... 370/329 |

* cited by examiner

*Primary Examiner* — Eva Puente
(74) *Attorney, Agent, or Firm* — Kilpatrick Townsend & Stockton LLP (57) ABSTRACT

Every k (k≥2) sampling values of sampling values in a time series obtained by sampling reception signal from GPS satellite are selected, and addition-subtraction of the selected k sampling values is performed by changing the combinations of addition and subtraction. Using addition-subtraction results of a combination corresponding to time-series change in code values of a replica code from among the combinations of addition and subtraction, a correlation result of the reception signal and the replica code is calculated. The satellite signal of the GPS satellite is acquired using the correlation result.

7 Claims, 9 Drawing Sheets

| RECEPTION DATA SET | REPLICA OFFSET | | | | | |
|---|---|---|---|---|---|---|
| | 1 | 2 | 3 | 4 | ..... | 2112 |
| S1 | p(1, 1) | p(1, 2) | p(1, 3) | p(1, 4) | ..... | p(1, 2112) |
| S2 | p(2, 1) | p(2, 2) | p(2, 3) | p(2, 4) | ..... | p(2, 2112) |
| ..... | ..... | ..... | ..... | ..... | ..... | ..... |
| S1056 | p(1056, 1) | p(1056, 2) | p(1056, 3) | p(1056, 4) | ..... | p(1056, 2112) |

| CORRELATION VALUE | | | | | | |
|---|---|---|---|---|---|---|
| Σ | Corr1 | Corr2 | Corr3 | Corr4 | ..... | Corr2112 |

FIG. 9 though this application claims priority to Japanese Patent Application No. 2012-002803, filed Jan. 11, 2012, the entirety of which is hereby incorporated by reference.

METHOD OF CAPTURING SATELLITE SIGNAL AND DEVICE FOR CAPTURING SATELLITE SIGNAL

This application claims priority to Japanese Patent Application No. 2012-002803, filed Jan. 11, 2012, the entirety of which is hereby incorporated by reference.

BACKGROUND

1. Technical Field

The present invention relates to a method of capturing a satellite signal, or the like.

2. Related Art

As a positioning system using satellite signals, a GPS (Global Positioning System) is widely known, and is used for a position calculation device which is embedded in a mobile phone, a car navigation device, or the like. In the GPS, position calculation is performed to obtain the position coordinates and timepiece errors of the position calculation device on the basis of information regarding the positions of a plurality of GPS satellites or the pseudo distance from each GPS satellite to the position calculation device.

GPS satellite signals sent from the GPS satellites are modulated with spread codes which are called C/A (Coarse and Acquisition) codes and different between the GPS satellites. In order to capture the weak GPS satellite signals, the position calculation device performs correlation computation between the received signal (reception signal) of the C/A code and the signal (replica code) of a replica code simulating the C/A code to capture the GPS satellite signals.

Specifically, the correlation computation is performed while shifting the phase of the replica code, the phase at which the highest correlation value is obtained becomes a so-called code phase, and the GPS satellite signals are captured. For example, U.S. Unexamined Patent Application Publication No. 2006/0056497 discloses a technique for accelerating the acquisition of the GPS satellite signals in a weak electric field environment or the like.

However, in the correlation computation of the related art, processing for multiplying and integrating each of the sampling value of the reception signal and the sampling value of the replica code should be performed for the number of phase shifts. For this reason, the circuit scale inevitably increases. This problem causes an increase in power consumption.

SUMMARY

An advantage of some aspects of the invention is that it provides a method of realizing correlation computation between a reception signal and a replica code with a small amount of computation.

A first aspect of the invention is directed to a method of acquiring a satellite signal including selecting every k (k≥2) sampling values from sampling values in a time series obtained by sampling a reception signal from a satellite, performing addition-subtraction of the selected k sampling values by changing combinations of addition and subtraction, calculating a correlation result of the reception signal and a replica code using the addition-subtraction results of a combination corresponding to time-series change in code values of the replica code from among the combinations of addition and subtraction, and acquiring the satellite signal of the satellite using the correlation result.

The first aspect of the invention may be configured, as another aspect of the invention, as a device for acquiring a satellite signal including a selection control unit which performs control to select every k (k≥2) sampling values from sampling values in a time series obtained by sampling a reception signal from a satellite, an addition-subtraction unit which performs addition-subtraction of the selected k sampling values by changing combinations of addition and subtraction, a correlation result calculation unit which calculates a correlation result of the reception signal and a replica code using the addition-subtraction results of a combination corresponding to time-series change in code values of the replica code from among the combinations of addition and subtraction, and an acquiring unit which acquires the satellite signal of the satellite using the correlation result.

According to the first aspect and the like of the invention, every k (k≥2) sampling values from the sampling values in a time series obtained by sampling the reception signal from the satellite are selected. The addition-subtraction of the selected k sampling values is performed by changing the combinations of addition and subtraction. The correlation result of the reception signal and the replica code is calculated using the addition-subtraction results of a combination corresponding to time-series change in the code values of the replica code from among the combinations of addition and subtraction.

Accordingly, the correlation result of the reception signal and the replica code can be calculated without multiplying the sampling values of the reception signal and the code values of the replica code. When multiplication is realized as software processing or when multiplication is constituted as an electronic circuit, an enormously large number of processing steps or circuits are required compared to addition-subtraction. For this reason, the effect that multiplication is not required is very large. Therefore, power consumption is of course reduced.

As a second aspect of the invention, the method of acquiring a satellite signal according to the first aspect of the invention may be configured such that the calculating of the correlation result includes changing a correlation calculation position of the code values of the replica code and calculates the correlation result using the addition-subtraction results of a combination corresponding to time-series change from the correlation calculation position of the code values of the replica code, and the acquiring of the satellite signal includes determining a code phase based on the correlation calculation position corresponding to a maximum correlation value from among a plurality of correlation values calculated by changing the correlation calculation position.

According to the second aspect of the invention, the correlation calculation position of the code values of the replica code is changed, and the correlation result is calculated using the addition-subtraction results of a combination corresponding to time-series change from the correlation calculation position of the code values of the replica code. Accordingly, the same computation results as when correlation computation is performed by changing the phase of the replica code to calculate the correlation result can be obtained. The code phase is determined based on the correlation calculation position corresponding to the maximum correlation value from among a plurality of correlation values calculated by changing the correlation calculation position, thereby determining the code phase of the reception signal.

As a third aspect of the invention, the method of acquiring a satellite signal according to the first aspect of the invention may be configured such that k is equal to or greater than 4, the performing of the addition-subtraction includes dividing the k sampling values into two groups, performing first addition-subtraction of sampling values in each of the groups by changing the combinations of addition and subtraction, and performing second addition-subtraction of the first addition-subtraction results by changing the combinations of addition and subtraction between the groups, and the second addition-subtraction results are set as the addition-subtraction results of the k sampling values.

According to the third aspect of the invention, the first addition-subtraction is performed by changing the combinations of addition and subtraction of the sampling values in each of the two groups of the k (k is equal to or greater than 4) sampling values. The second addition-subtraction of the first addition-subtraction results is performed by changing the combinations of addition and subtraction. Therefore, the same effects as when addition-subtraction of the k sampling values is performed by changing the combinations of addition and subtraction can be obtained.

As a fourth aspect of the invention, the method of acquiring a satellite signal according to the third aspect of the invention may be configured such that the method further includes storing the first addition-subtraction results of each group in a first storage unit, and the performing of the second addition-subtraction includes performing the second addition-subtraction using the first addition-subtraction results stored in the first storage unit.

According to the fourth aspect of the invention, the first addition-subtraction results of each group are stored in the first storage unit. The second addition-subtraction is performed using the first addition-subtraction results stored in the first storage unit. Accordingly, since the first addition-subtraction results are stored in the first storage unit, it is not necessary to execute the first addition-subtraction having the same computation results many times, thereby realizing correlation computation with a smaller amount of computation.

As a fifth aspect of the invention, the method of acquiring a satellite signal according to the fourth aspect of the invention may be configured such that, in the performing of the second addition-subtraction, an addition-subtraction unit performs the second addition-subtraction using the first addition-subtraction results stored in the first storage unit when calculating the correlation result, and the calculating of the correlation result selects an addition-subtraction result corresponding to time-series change in the code values of the replica code from among the addition-subtraction results of the addition-subtraction unit and calculates the correlation result.

According to the fifth aspect of the invention, the addition-subtraction unit performs the second addition-subtraction using the first addition-subtraction results stored in the first storage unit when calculating the correlation result. The addition-subtraction result corresponding to time-series change in the code values of the replica code is selected from among the addition-subtraction results of the addition-subtraction unit, thereby calculating the same correlation result as when correlation computation between the reception signal and the replica code is performed.

As a sixth aspect of the invention, the method of acquiring a satellite signal according to the fourth aspect of the invention may be configured such that the method further includes storing the second addition-subtraction results in a second storage unit, and the calculating of the correlation result reads an addition-subtraction result corresponding to time-series change in the code values of the replica code from the second storage unit and calculates the correlation result.

According to the sixth aspect of the invention, the second addition-subtraction results are stored in the second storage unit. The addition-subtraction result corresponding to time-series change in the code values of the replica code is read from the second storage unit to calculate the correlation result. Accordingly, since the second addition-subtraction results are stored in the second storage unit, it is not necessary to execute the second addition-subtraction having the same computation results many times, thereby realizing correlation computation with a smaller amount of computation.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an example of a preferred embodiment to which the invention is applied will be described. This embodiment is an embodiment in which the invention is applied to a GPS (Global Positioning System) as a type of satellite positioning system.

1. Principle

A satellite signal capturing method in this embodiment will be described. In a GPS, a GPS satellite as a type of positioning satellite sends a navigation message including satellite orbit data, such as almanac or ephemeris, along with a GPS satellite signal as a type of positioning satellite signal.

GPS satellite signal is a communication signal with 1.57542 [GHz] BPSK (Binary Phase Shift Keying) modulated by a CDMA (Code Division Multiple Access) system, which is known as a spread spectrum system, using a C/A (Coarse and Acquisition) code as a type of spread code. The C/A code is a pseudo random noise signal in a repetition period of 1 ms with a code length 1023 chip as 1 PN frame.

While the frequency when the GPS satellite sends the GPS satellite signal (specified carrier frequency) is specified as 1.57542 [GHz] in advance, the frequency at which the GPS reception device receives the GPS satellite signal does not necessarily coincide with the specified carrier frequency due to Doppler effect caused by the movement of the GPS satellite or the GPS reception device. For this reason, in order to capture the GPS satellite signal from the received electric wave, so-called frequency search is performed. In order to specify the phase of the received GPS satellite signal (C/A code), that is, a code phase, so-called phase search is performed.

With two types of search, the GPS satellite signal is captured. However, if the frequency is known, only phase search may be performed to capture the GPS satellite signal. This embodiment has a feature about correlation computation which is performed in frequency search and phase search, that is, a method of calculating a correlation value.

Figure 1:
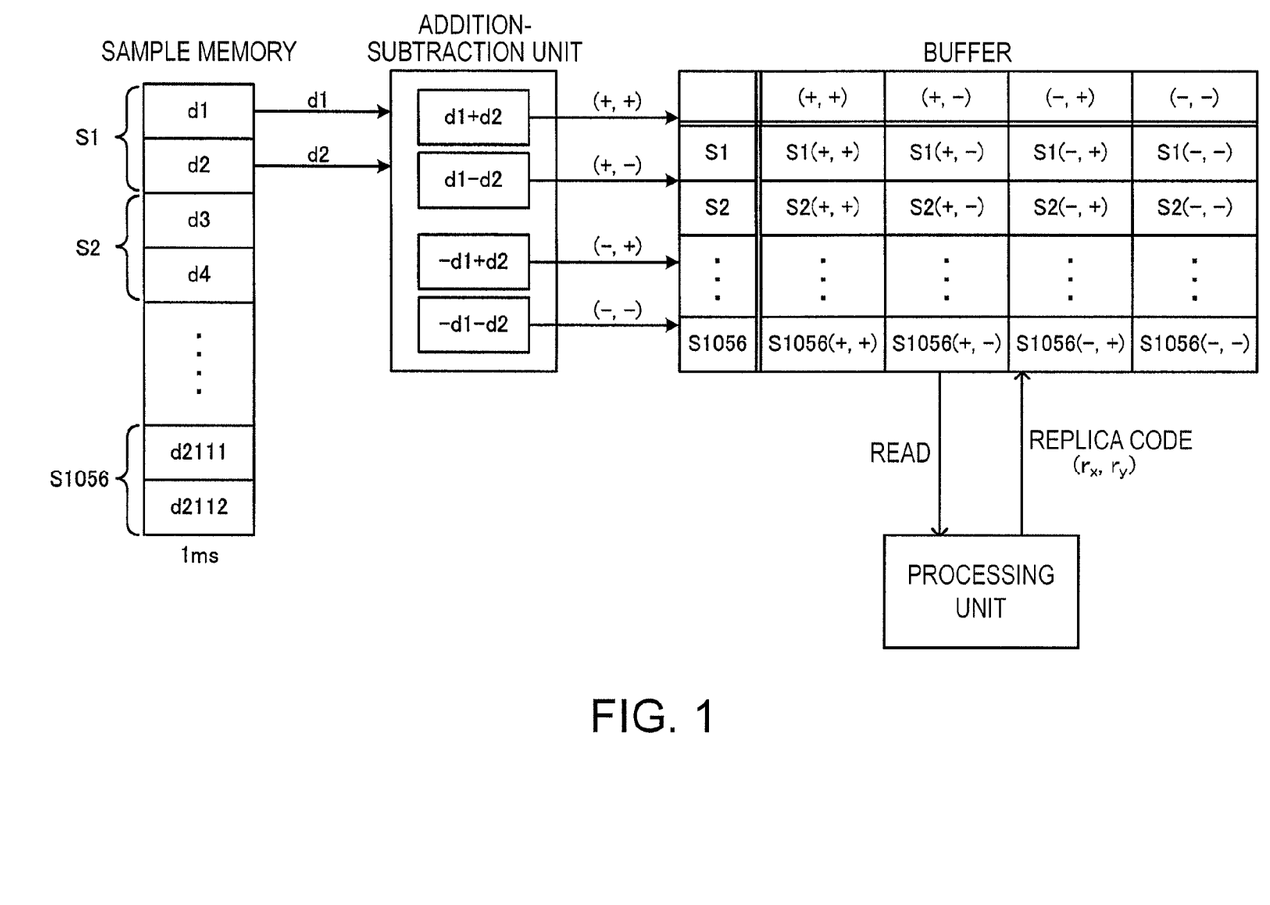
FIG. 1 is an explanatory view of a method of calculating a correlation value in a principle description.

FIG. 1 is an explanatory view of a method of calculating a correlation value in this embodiment. In FIG. 1, a sample memory stores values (hereinafter, referred to as "sampling values") obtained by sampling the reception signals for 1 millisecond. In this embodiment, sampling is done 2112 times for 1 millisecond. For this reason, the sample memory stores 2112 sampling values of "d1" to "d2112" as the sampling values for 1 millisecond. The carrier of the GPS satellite signal may be removed before sampling the reception signals or after sampling.

Next, a processing unit selects k sampling values which are output to an addition-subtraction unit. That is, the processing unit corresponds to a selection control unit which performs control to select every k sampling values in a time series obtained by sampling the reception signals. In this embodiment, it is assumed that the value of k is equal to or greater than 2 (k≥2).

While the value of k can be appropriately selected, as the description of the principle, the simplest example where "k=2" will be described. In this case, since every two sampling values of the sampling values "d1" to "d2112" of the reception signals are selected, 1056 sets of reception data are obtained. The 1056 reception data sets are represented as "S(i)=S1 to S1056". "i=1 to 1056" represents the number of the reception data set. Specifically, "S1=(d1,d2)", "S2=(d3,d4)", ..., and "S1056=(d2111,d2112)" are represented.

If each of the reception data sets "S1" to "S1056" is selected and output to the addition-subtraction unit, the addition-subtraction unit performs addition-subtraction of two sampling values included in the reception data set while changing the combinations of addition and subtraction. In other words, the addition-subtraction unit adds k sampling values included in the reception data set while varying the combination of negative and positive signs for each reception data set.

For example, description will be provided focusing on the reception data set "S1" shown in FIG. 1. Addition-subtraction of the sampling values "d1" and "d2" included in the reception data set "S1" is performed while changing the combinations of addition and subtraction. As a result, four addition-subtraction results of "d1+d2", "d1−d2", "−d1+d2", and "−d1−d2" are obtained. The addition-subtraction is performed for all of the reception data sets "S1" to "S1056".

In FIG. 1, combinations of positive and negative signs when addition-subtraction of two sampling values included in a reception data set is performed are represented in the bracket while being separated by a coma in sequence. Specifically, addition-subtraction of positive signs is represented as (+,+), and addition-subtraction of positive and negative signs is represented as (+,−). Addition-subtraction of negative and positive signs is represented as (−,+), and addition-subtraction of negative signs is represented as (−,−).

The addition-subtraction results are stored in a buffer (storage unit). In the buffer of FIG. 1, the horizontal column represents the combinations {(+,+), (+,−), (−,+), (−,−)} of positive and negative signs, and the vertical column represents the reception data sets "S1" to "S1056". For each of the reception data sets "S1" to "S1056", the addition-subtraction results of the sampling values with four combinations of positive and negative signs are stored in a corresponding region of the buffer.

The replica codes are sampled at the same sampling time interval as the reception signal for the sake of correlation computation. In this embodiment, the replica codes which become the code length 1023 chip are sampled 2112 times. The values (hereinafter, referred to as "code values") of the sampled replica codes are referred to as "r1" to "r2112" with symbol "r".

The processing unit selects every k code values of the 2112 code values while shifting a selection start position by one code value. Here, since "k=2" is considered, (r1,r2) is selected first, (r2,r3) is selected second, (r3,r4) is selected third, ..., and (r2112,r1) is selected 2112nd.

As a result, 2112 replica data sets in total are obtained. The 2112 replica data sets are represented as "R(h)=R1 to R2112". However, "h=1 to 2112" represents the number of the replica data set. Specifically, "R1=(r1,r2)", "R2=(r2,r3)", "R3=(r3,r4)", "R4=(r4,r5)", "R2111=(r2111,r2112)", and "R2112=(r2112,r1)" are represented.

In this embodiment, for each reception data set, the correlation values of the reception signals and the replica codes are calculated using the addition-subtraction results of a combination corresponding to time-series change in the code values of the replica codes from among the combinations of addition and subtraction. The correlation values calculated by the method of this embodiment may be referred to as correlation values corresponding to values obtained by correlation computation between the reception signals and the replica codes. For simplification of description, first, a case where calculation is performed without shifting the phase of the replica code will be described.

For example, when focusing on the reception data set "S1=(d1,d2)", the replica data set corresponding to the reception data set "S1" becomes the replica data set "R1=(r1,r2)" because the phase is not shifted. For example, if two code values included in the replica data set "R1" are "+1,−1", the processing unit selects the addition-subtraction result "S1 (+,−)" with a combination of positive and negative signs of "(+,−)" from among four addition-subtraction results concerning the reception data set "S1" stored in the buffer.

At this time, the selected addition-subtraction result "S1 (+,−)" becomes the calculation result of the correlation between the reception data set "S1=(d1,d2)" and the replica data set "R1=(r1,r2)". That is, the calculation result of "d1×r1+d2×r2" becomes the addition-subtraction result "S1 (+,−)". That is, the calculation result of "d1−r1+d2×r2" can be calculated without multiplication. This is one of the features of this embodiment.

Hereinafter, the selected addition-subtraction result, that is, the addition-subtraction result having a value corresponding to the calculation result of the correlation of one reception data set and one replica data set is called a "product value".

Similarly, for example, when focusing on the reception data set "S2=(d3,d4)", the replica data set corresponding to the reception data set "S2" becomes the replica data set "R3=(r3,r4)" because the phase is not shifted. For example, if two code values included in the replica data set "R3" are "−1,−1", the processing unit selects the addition-subtraction result "S2 (−,−)" with a combination of positive and negative signs of "(−,−)" from among four addition-subtraction results concerning the reception data set "S2" stored in the buffer.

At this time, the selected addition-subtraction result "S2 (−,−)" becomes the calculation result of the correlation between the reception data set "S2=(d3,d4)" and the replica data set "R3=(r3,r4)". That is, the calculation result of "d3×r3+d4×r4" becomes the addition-subtraction result "S2 (−,−)".

In this way, the processing unit selects the addition-subtraction result from the buffer in accordance with the above-described steps and determines (selects) the product values for all of the reception data sets "S1" to "S1056". The processing unit totals the product values to calculate the correlation values of the reception signals and the replica codes for one C/A code period. The correlation values calculated in this way correspond to values obtained by correlation computation between the reception signals and the replica codes. Accordingly, it can be said that the processing unit has a function of a correlation value calculation unit.

The totaling of the product values is performed only by addition. Accordingly, in the method of this embodiment, the correlation values can be calculated without multiplication. This has a functional effect of reducing the circuit scale of an electronic circuit. When the correlation values are calculated with calculation by software, it becomes possible to significantly reduce the number of computation steps.

Although a case where the correlation values are calculated without shifting the phase has been described, in regard to the correlation computation in the GPS, the correlation computation between a reception signal and a replica code is executed while shifting the phase of the replica code. A replica data set corresponding to a reception data set changes depending on the shift amount of the phase to calculate a correlation value. The shift amount is referred to as a "replica offset".

For example, it is considered that, the replica offset is "j", when "j=1", the shift amount is zero, and when "j=2", the phase for one sampling position is shifted. At this time, the calculation of the correlation values is performed with the replica data set corresponding to the reception data set "S(i)" as "R(2i+j−2)".

Specifically, if the replica offset is "1" (j=1), the replica data set corresponding to the reception data set "S1=(d1,d2)" is "R1=(r1,r2)", the replica data set corresponding to the reception data set "S2=(d3,d4)" is "R3=(r3,r4)", . . . , the replica data set corresponding to the reception data set "S1056=(d2111,d2112)" is "R2111=(r2111,r2112)".

For example, if the replica offset is "2" (j=2), the replica data set corresponding to the reception data set "S1=(d1,d2)" is "R2=(r2,r3)", the replica data set corresponding to the reception data set "S2=(d3,d4)" is "R4=(r4,r5)", . . . , and the replica data set corresponding to the reception data set "S1056=(d2111,d2112)" is "R2112=(r2112,r1)".

If "j" changes from "1" to "2112", the phase is shifted for one C/A code period. The replica offset corresponds to a correlation calculation position of the code values of the replica code.

Figure 2:
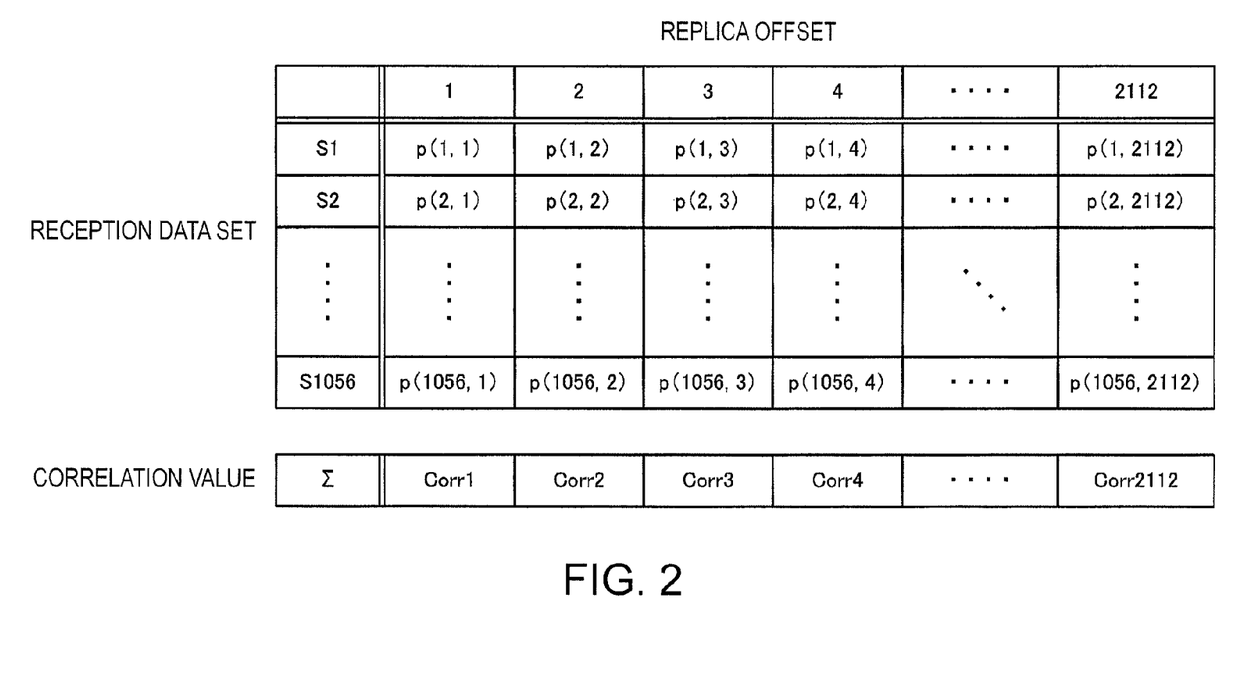
FIG. 2 is an explanatory view of a method of calculating a correlation value in a principle description.

FIG. 2 is a diagram showing a product value and a correlation value obtained while shifting the phase for one C/A code period in a table format. For the m-th (m=1 to 1056) reception data set "Sm", a product value obtained when the replica offset is set to "n" (n=1 to 2112) is represented as "p(m,n)". For example, when the replica offset is set to "1", the product values obtained for the reception data sets "S1" to "S1056" are represented as "p(1,1)" to "p(1056,1)". Similarly, when the replica offset is set to "2", the product values obtained for the reception data sets "S1" to "S1056" are represented as "p(1,2)" to "p(1056,2)".

For each replica offset, if the product values concerning the reception data sets "S1" to "S1056" are totaled, the correlation value "Corr" is calculated. For example, for the replica offset "1", if the product values "p(1,1)" to "p(1056,1)" concerning the reception data sets "S1" to "S1056" are totaled, a correlation value "Corr1" concerning the replica offset "1" is calculated. If the same computation is performed for all of the replica offsets, correlation values "Corr1" to "Corr2112" concerning the replica offsets "1" to "2112" are calculated.

The processing unit calculates the correlation values while changing the replica offsets, thereby finally calculating each value of the table shown in FIG. 2. The code phase is determined on the basis of the replica offset corresponding to the maximum correlation value from among the calculated correlation values. This corresponds to the determination of the code phase on the basis of the correlation calculation position corresponding to the maximum correlation value from among a plurality of correlation values calculated while changing the correlation calculation position (replica offset).

2. Examples

Next, examples of a satellite signal capturing device which captures a satellite signal using the above-described satellite signal capturing method will be described. As an example of an electronic apparatus including a satellite signal capturing device, an example of a mobile phone will be described. Of course, examples to which the invention can be applied are not limited to the following examples.

2-1. First Example 2-1-1. Configuration of Mobile Phone

Figure 3:
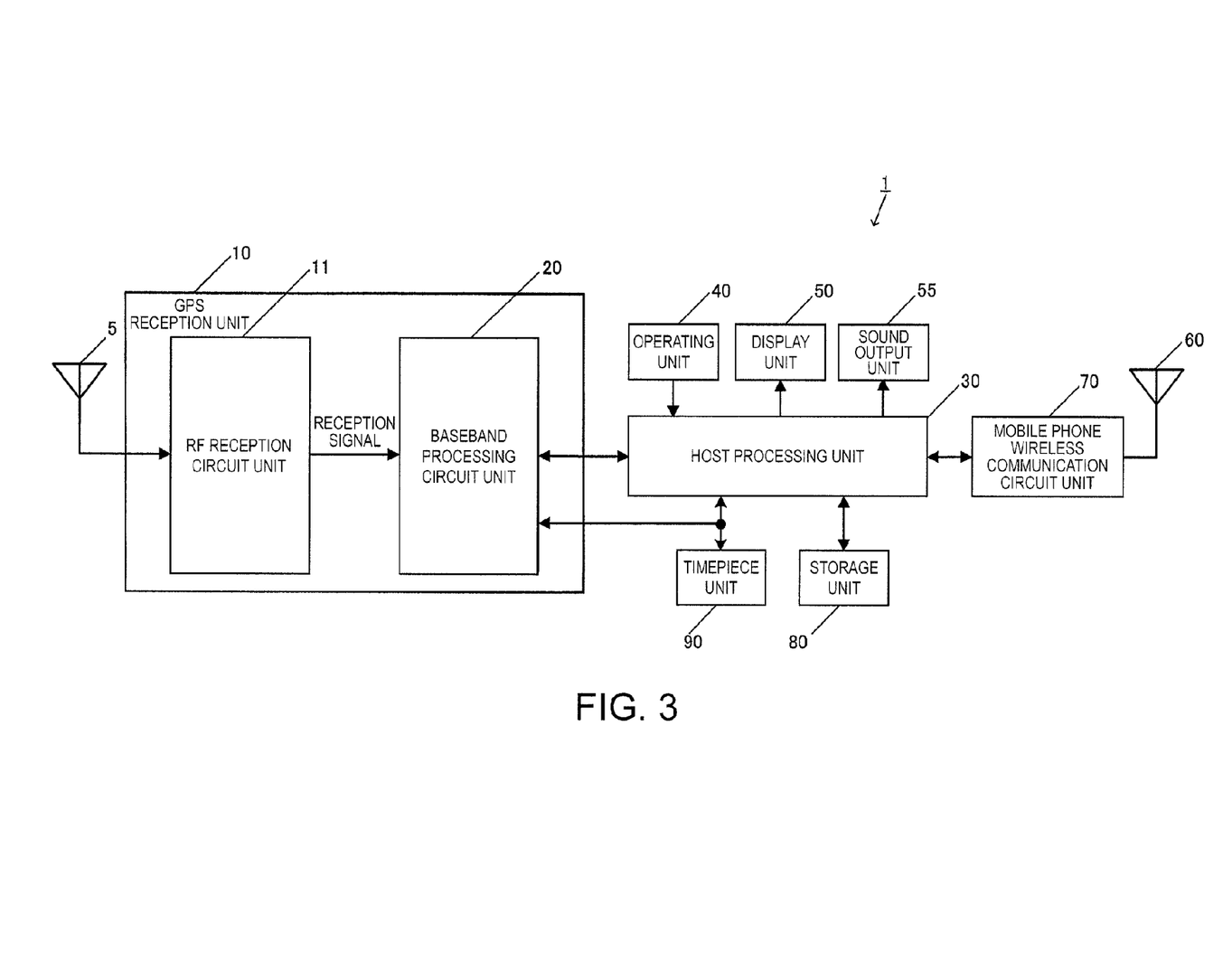
FIG. 3 is a block diagram showing an example of the functional configuration of a mobile phone.

FIG. 3 is a block diagram showing an example of the functional configuration of a mobile phone 1 of this example. The mobile phone 1 includes a GPS antenna 5, a GPS reception unit 10, a host processing unit 30, an operating unit 40, a display unit 50, a sound output unit 55, a mobile phone antenna 60, a mobile phone wireless communication circuit unit 70, a storage unit 80, and a timepiece unit 90.

The GPS antenna 5 is an antenna which receives RF (Radio Frequency) signals including GPS satellite signals sent from GPS satellites, and outputs reception signals to the GPS reception unit 10.

The GPS reception unit 10 is a circuit or a device which calculates the position of the mobile phone 1 on the basis of the signal output from the GPS antenna 5, and corresponds to a so-called GPS receiver. In this embodiment, the GPS reception unit 10 corresponds to a satellite signal capturing device.

The GPS reception unit 10 includes an RF reception circuit unit 11 and a baseband processing circuit unit 20. The RF reception circuit unit 11 and the baseband processing circuit unit 20 may be manufactured as separate LSI (Large Scale Integration) or may be manufactured as one chip.

The RF reception circuit unit 11 is a reception circuit unit of RF signals. As a circuit configuration, for example, a reception circuit in which an RF signal output from the GPS antenna 5 is converted to a digital signal by an A/D converter, and the digital signal is processed may be provided. A configuration in which signal processing is performed on an RF signal output from the GPS antenna 5 as an analog signal, and after A/D conversion, a digital signal is finally output to the baseband processing circuit unit 20 may be provided.

In the latter case, for example, the RF reception circuit unit 11 may be configured as follows. That is, a predetermined oscillation signal is divided or multiplied to generate an oscillation signal for RF signal multiplication. The generated oscillation signal is multiplied to the RF signal output from the GPS antenna 5 to down-convert the RF signal to an intermediate-frequency signal (hereinafter, referred to as "IF (Intermediate Frequency) signal"), and the IF signal is amplified or the like, converted to a digital signal by the A/D converter, and output to the baseband processing circuit unit 20.

The baseband processing circuit unit 20 performs carrier removal, correlation value calculation, or the like on the reception signal output from the RF reception circuit unit 11 to capture the GPS satellite signal. The position of the mobile phone 1 and timepiece errors are calculated using time information, satellite orbit information, or the like extracted from the captured GPS satellite signal.

The host processing unit 30 is a processor which performs overall control of the respective units of the mobile phone 1 in accordance with various programs, such as a system program stored in the storage unit 80, and has a processor, such as a CPU (Central Processing Unit). The host processing unit 30 causes the display unit 50 to display a map indicating the current position on the basis of the position coordinates acquired from the baseband processing circuit unit 20, or uses the position coordinates for various kinds of application processing.

The operating unit 40 is, for example, an input device having a touch panel, a button switch, or the like, and outputs a signal of a depressed key or button to the host processing unit 30. With the operation of the operating unit 40, the input of various instructions, such as a call request, a mail transmission/reception request, a request to execute various applications, and a position calculation request, is made.

The display unit 50 is a display device having an LCD (Liquid Crystal Display) or the like, and performs various kinds of display based on a display signal output from the host processing unit 30. A position display screen, time information, or the like is displayed on the display unit 50.

The sound output unit 55 is a sound output device having a speaker or the like, and outputs various kinds of sound based on a sound output signal output from the host processing unit 30. Sound, such as voice during a call or sound concerning various applications, is output from the sound output unit 55.

The mobile phone antenna 60 is an antenna which performs transmission/reception of a mobile phone radio signal with a wireless base station provided by a communication service provider of the mobile phone 1.

The mobile phone wireless communication circuit unit 70 is a communication circuit unit of the mobile phone which has an RF conversion circuit, a baseband processing circuit, and the like, and performs modulation and demodulation of the mobile phone radio signal, thereby realizing transmission/reception of a call or a mail, or the like.

The storage unit 80 has a storage device, such as a ROM (Read Only Memory), a flash ROM, or a RAM (Random Access Memory), and stores a system program used when the host processing unit 30 controls the mobile phone 1, or various programs or data for executing various kinds of application processing.

The timepiece unit 90 is an internal timepiece of the mobile phone 1, and has a crystal oscillator having a crystal vibrator and an oscillation circuit, or the like. The clocking time of the timepiece unit 90 is output to the baseband processing circuit unit 20 and the host processing unit 30 at any time. The clocking time of the timepiece unit 90 is corrected on the basis of timepiece errors calculated by the baseband processing circuit unit 20.

2-1-2. Circuit Configuration of Baseband Processing Circuit Unit

Figure 4:
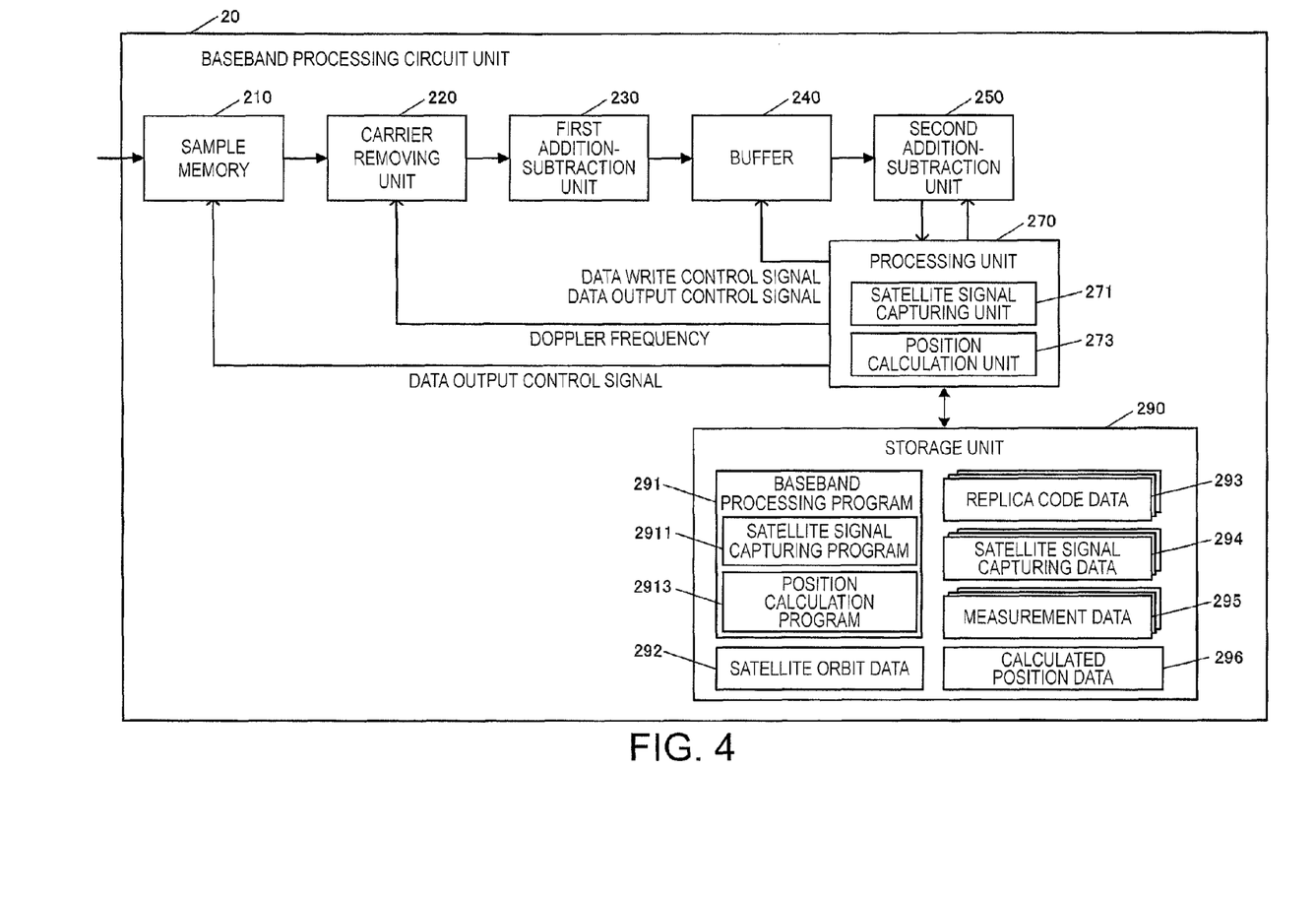
FIG. 4 is a block diagram showing an example of the circuit configuration of a baseband processing circuit unit.

FIG. 4 is a diagram showing an example of the circuit configuration of the baseband processing circuit unit 20 focusing on a circuit block involved in this example. The baseband processing circuit unit 20 includes, as a main part, a sample memory 210, a carrier removing unit 220, a first addition-subtraction unit 230, a buffer 240, a second addition-subtraction unit 250, a processing unit 270, and a storage unit 290.

The sample memory 210 is a memory which stores the sampling values of the reception signals output from the RF reception circuit unit 11. The sample memory 210 selects a sampling value in response to an output control signal of data output from the processing unit 270, and outputs the sampling value to the carrier removing unit 220.

The carrier removing unit 220 multiplies a digitized carrier removing signal (the sampling value of the carrier removing signal) to the reception signal (the sampling value of the reception signal) output from the sample memory 210, thereby detecting the reception signal.

Specifically, for each capturing-target satellite, the carrier removing signal with a frequency obtained by adding the Doppler frequency of the GPS satellite signal received from the capturing-target satellite to a frequency when a carrier frequency is down-converted to an IF frequency is generated. The generated carrier removing signal is multiplied to the reception signal. Accordingly, the detection of the reception signal is performed, and data of the reception signal with the carrier removed is output to the first addition-subtraction unit 230.

The first addition-subtraction unit 230 has, for example, a logic circuit, and performs first addition-subtraction on the sampling value of the reception signal output from the carrier removing unit 220 while changing the combinations of addition and subtraction. The computation results of the first addition-subtraction unit 230 are output to the buffer 240.

The buffer 240 is a storage unit (first storage unit) which temporarily stores the computation results of the first addition-subtraction unit 230. The buffer 240 writes the computation results of the first addition-subtraction unit 230 in response to a write control signal of data output from the processing unit 270. The buffer 240 also selects written data and outputs written data to the second addition-subtraction unit 250 in response to an output control signal of data output from the processing unit 270.

The second addition-subtraction unit 250 has, for example, a logic circuit, and performs second addition-subtraction for the first addition-subtraction results output from the buffer 240 while changing the combinations of addition and subtraction. The computation results of the second addition-subtraction unit 250 are output to the processing unit 270.

The processing unit 270 is a control device and arithmetic device which performs overall control of the respective functional units of the baseband processing circuit unit 20, and has a processor, such as a CPU or a DSP (Digital Signal Processor). The processing unit 270 has, as a main functional unit, a satellite signal capturing unit 271 and a position calculation unit 273.

The satellite signal capturing unit 271 is a functional unit which captures GPS satellite signals. Specifically, the addition-subtraction result corresponding to time-series change in the code values of the replica codes from among the addition-subtraction results of the second addition-subtraction unit 250 is selected, and the correlation values of the reception signals and the replica codes are calculated. The GPS satellite signals of the GPS satellites are captured using the calculated correlation values.

The position calculation unit 273 performs predetermined position calculation processing using the GPS satellite signals captured by the satellite signal capturing unit 271 to calculate the position (position coordinates) of the mobile phone 1 and timepiece errors (clock bypass). For example, the position calculation processing can be realized as processing to which a least-square method, a Kalman filter, or the like is applied.

The storage unit 290 stores a system program of the baseband processing circuit unit 20, various programs for realizing various functions, such as a satellite signal capturing function and a position calculation function, data, and the like. The storage unit 290 has a work area which temporarily stores in-processing data, processing results, and the like of various kinds of processing.

2-1-3. Method of Calculating Correlation Value

Figure 5:
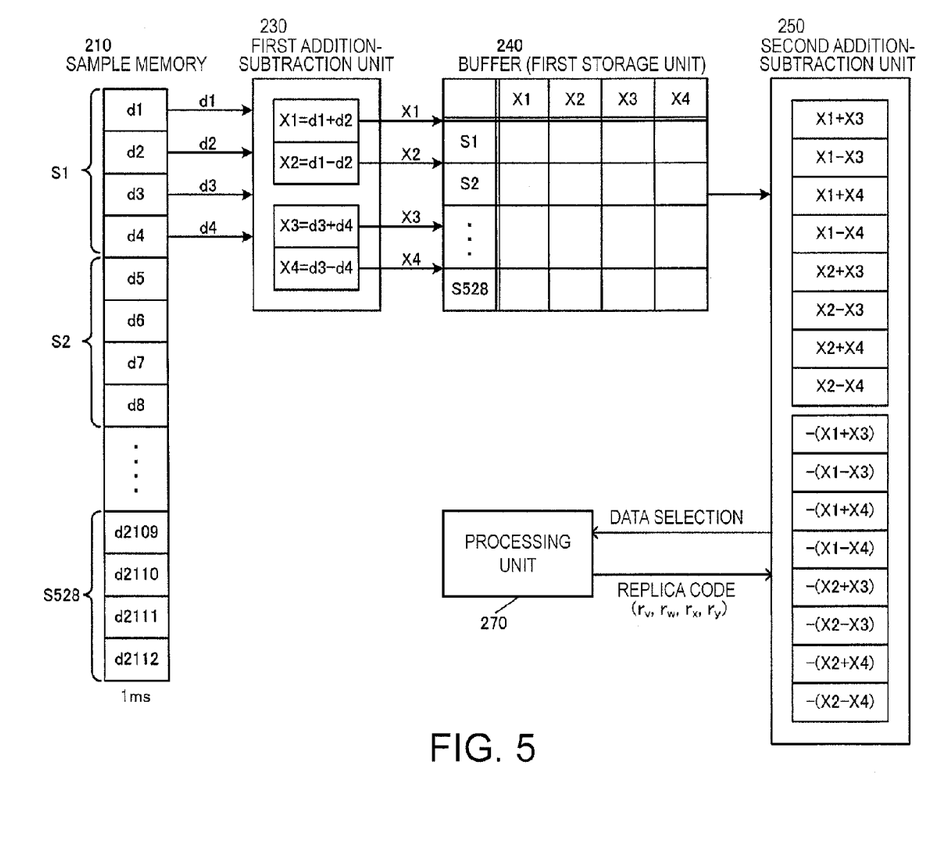
FIG. 5 is an explanatory view of a method of calculating a correlation value in a first example.

FIG. 5 is an explanatory view of a method of calculating a correlation value in the first example. In the first example, the correlation values are calculated assuming that k is equal to or greater than 4 (k≥4). As the simplest example, a case where "k=4" will be described. For clear description, in FIG. 5, the carrier removing unit 220 is not shown.

Initially, every four sampling values of the sampling values "d1" to "d2112" of the reception signals stored in the sample memory 210 are selected to generate the reception data sets "S1" to "S528". Next, for each of the reception data sets "S1" to "S528", the first addition-subtraction unit 230 performs addition-subtraction of four sampling values included in the reception data set while changing the combinations of addition and subtraction. At this time, the four sampling values are divided into two groups in two sampling values, and for each group, addition-subtraction of the two sampling values is performed while changing the combinations of addition and subtraction.

Description will be provided focusing on the reception data set "S1". The sampling values "d1" to "d4" included in the reception data set "S1" are divided into a first group of "d1" and "d2" and a second group of "d3" and "d4". For each of the first group and the second group, addition-subtraction of the two sampling values is performed while changing the combinations of addition and subtraction.

As the combination of positive and negative signs for addition-subtraction, four combinations of $\{(+,+), (+,-), (-,-)\}$ are considered. However, since the $\{(+,+)$ and $(-,-)\}$, and $\{(+,-)$ and $(-,+)\}$ are combinations in which the positive and negative signs are inverted, the combinations with the inverted signs are omitted. Hereinafter, an example where addition-subtraction is performed with two combinations of $\{(+,+), (+,-)\}$ will be described.

If addition-subtraction is performed for the first group with the two combinations of the signs, "X1=d1+d2" and "X2=d1−d2" are obtained. If addition-subtraction is performed for the second group with the two combinations of the signs, "X3=d3+d4" and "X4=d3−d4" are obtained.

The above computation is performed for all of the reception data sets "S1" to "S528" to acquire first addition-subtraction results "X1" to "X4". The first addition-subtraction results concerning each reception data set are stored in the buffer 240 (first storage unit). FIG. 5 shows an example of a data structure of the buffer 240 which stores the first addition-subtraction results "X1" to "X4" of the reception data sets "S1" to "S528".

Next, the second addition-subtraction unit 250 performs second addition-subtraction for the first addition-subtraction results stored in the buffer 240. That is, the second addition-subtraction is performed for the first addition-subtraction results of each of the reception data sets "S1" to "S528" while changing the combinations of addition and subtraction between the two groups of the first group and the second group.

Specifically, for each of the combination of "X1" and "X3", the combination of "X1" and "X4", the combination of "X2" and "X3", and the combination of "X2" and "X4", addition-subtraction is performed while changing the combinations of addition and subtraction. As a result, 16 addition-subtraction results shown in FIG. 5 are obtained. The second addition-subtraction results obtained in this way are the addition-subtraction results of four (=k) sampling values.

The sample memory 210 to the second addition-subtraction unit 250 are constituted by electronic circuits. Accordingly, only if reading from the sample memory 210, writing to the buffer 240, and reading from the buffer 240 are instructed by the processing unit 270, computation is performed by the circuit operations of the first addition-subtraction unit 230 and the second addition-subtraction unit 250.

The processing unit 270 selects the addition-subtraction result corresponding to time-series change in the code values of the replica codes from among the addition-subtraction results of the second addition-subtraction unit 250 to calculate the correlation values. Specifically, as described in the principle, every four code values of the 2112 code values are selected while shifting the selection start position by one code value to generate the replica data sets "R1" to "R2112". The replica data set corresponding to the reception data set is selected on the basis of the replica offset, and the second addition-subtraction result with the same combination as the combination of positive and negative signs of four code values in the replica data set is selected. The value selected in this way becomes the product value concerning the reception data set.

For example, when the replica offset is "1 (the shift amount is zero)" (j=1), the replica data set corresponding to the reception data set "S1" becomes the replica data set "R1". For example, when the code values included in the replica data set "R1" are "+1, +1, −1, and −1", "+d1+d2−d3−d4=X1−X3" from among 16 second addition-subtraction results computed by the second addition-subtraction unit 250 is selected. The selected value is set as the product value concerning the reception data set "S1".

The same applies to other reception data sets. The product values concerning all of the reception data sets are totaled for each replica offset, thereby calculating the correlation value concerning each replica offset. The product value of each reception data set for each replica offset and the correlation value are stored in the satellite signal capturing data 294 by satellite (see FIG. 6).

2-1-4. Data Configuration

The storage unit 290 stores, as a program, a baseband processing program 291 which is read by the processing unit 270 and executed as baseband processing. The baseband processing program 291 includes, as a subroutine, a satellite signal capturing program 2911 which is executed as satellite signal capturing processing (see FIG. 7) and a position calculation program 2913 which is executed as position calculation processing. In regard to the position calculation processing, since the same processing as in the related art can be applied, description using a flowchart will not be provided.

The storage unit 290 stores, as main data, satellite orbit data 292, replica code data 293, satellite signal capturing data 294, measurement data 295, and calculated position data 296.

The satellite orbit data 292 is data, such as almanac or ephemeris of each GPS satellite. The satellite orbit data 292 is acquired by decoding the GPS satellite signals received from the GPS satellites, and acquired as assist data from the base station of the mobile phone 1 or an assist server.

The replica code data 293 is data in which the code value of a replica code simulating a C/A code is stored for each GPS satellite. Similarly to the sampling value of the reception signal, for example, data of 2112 sampled code values is stored.

Figure 6:
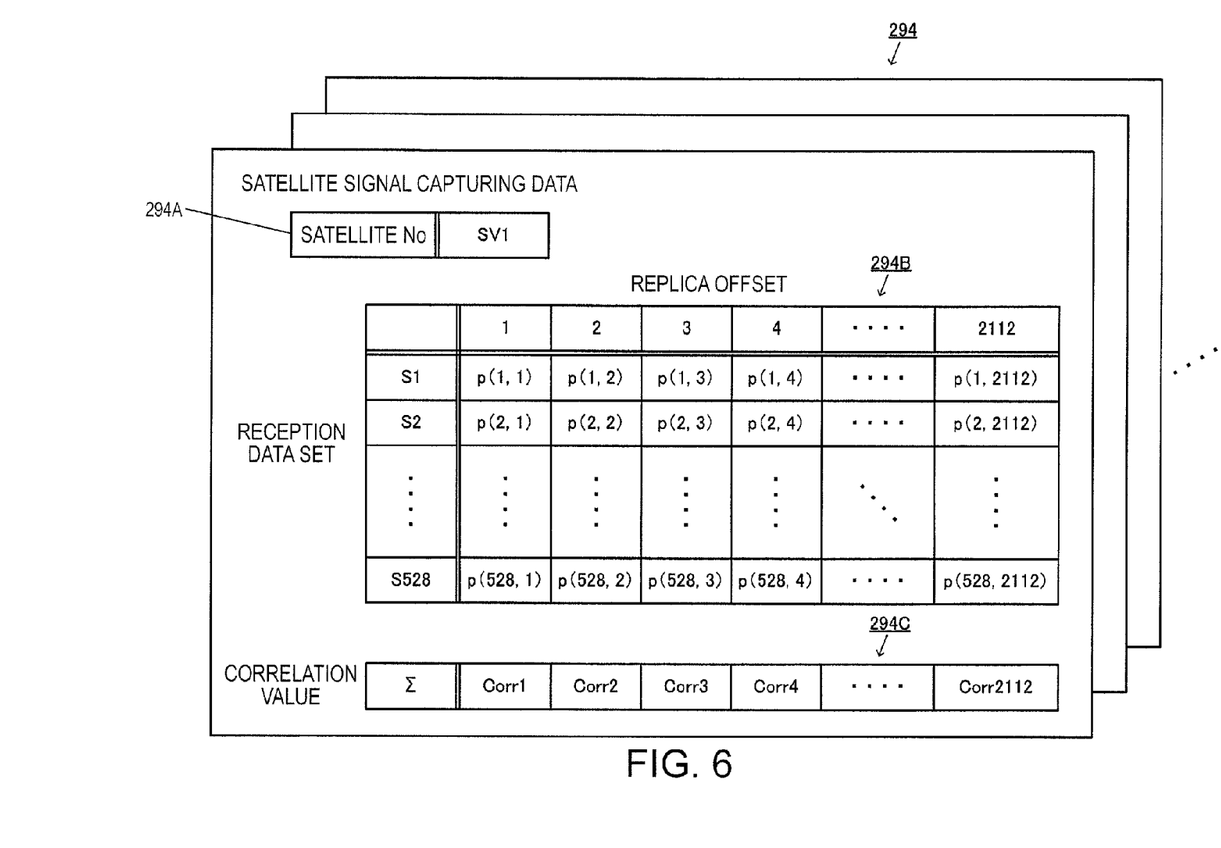
FIG. 6 is a data configuration diagram of satellite signal capturing data.

The satellite signal capturing data 294 is data which is used for capturing the satellite signal of each GPS satellite, and an example of the data configuration is shown in FIG. 6. The satellite signal capturing data 294 stores a satellite No. 294A as the number of the GPS satellite, product value data 294B specific to the reception data sets and replica offsets, and correlation value data 294C by replica offset.

The measurement data 295 is data in which measurement information regarding various kinds of amount, such as a code phase, a Doppler frequency, a pseudo distance, or a pseudo distance change rate concerning the captured GPS satellite signal, is stored by GPS satellite.

The calculated position data 296 is data of the calculation result acquired when the position calculation unit 273 performs position calculation processing, and includes the calculated position (position coordinates) of the mobile phone 1 or timepiece errors (clock bypass).

2-1-5. Flow of Processing

Figure 7:
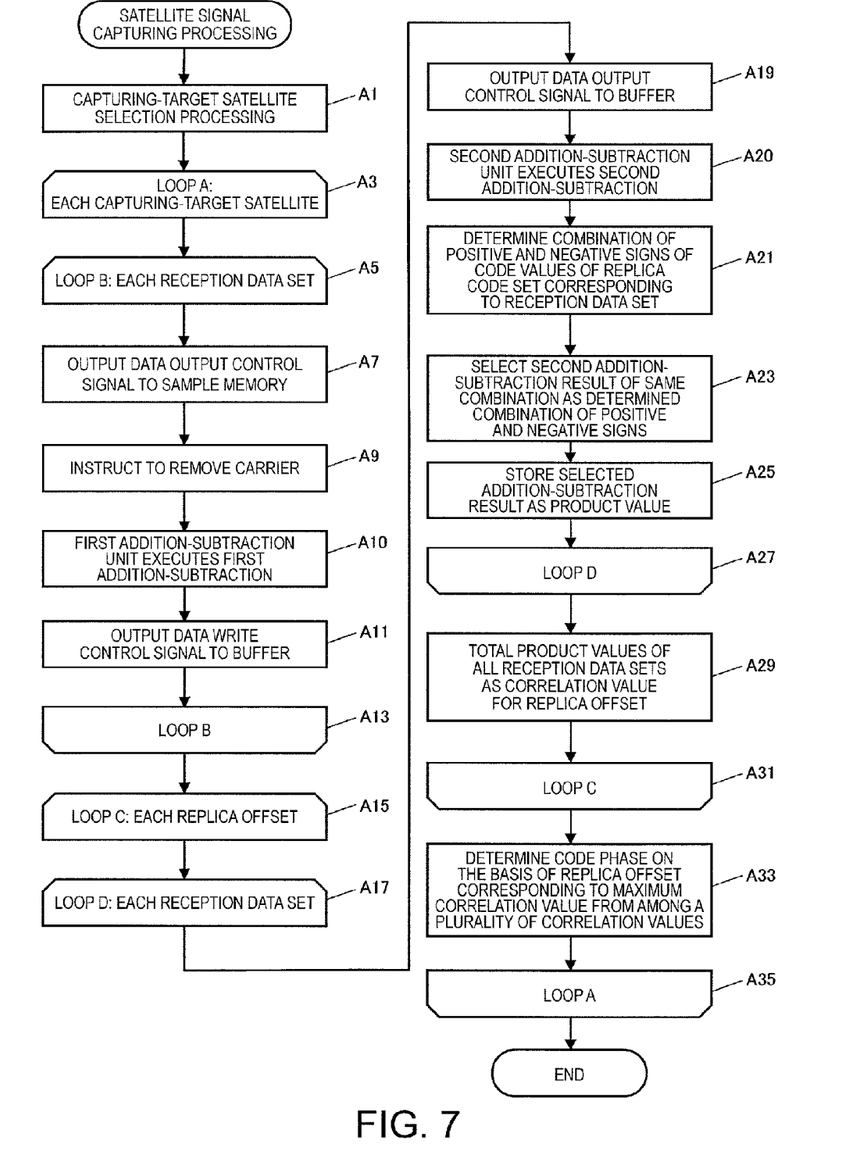
FIG. 7 is a flowchart showing a flow of satellite signal capturing processing.

FIG. 7 is a flowchart showing the flow of satellite signal capturing processing which is executed by the processing unit 270 in accordance with the satellite signal capturing program 2911 stored in the storage unit 290.

Initially, the satellite signal capturing unit 271 performs capturing-target satellite selection processing (Step A1). Specifically, a GPS satellite in the sky at a given reference position is measured using the satellite orbit data 292 of the storage unit 290 at the current time clocked by the timepiece unit 90, and selected as a capturing-target satellite. The reference position may be set by a method which sets a position acquired from the server by so-called server assist at the time of first position calculation after power activation and sets the latest calculation position at the time of second or subsequent position calculation.

Next, the satellite signal capturing unit 271 executes processing of a loop A for each capturing-target satellite selected in Step A1 (Steps A3 to A35). In the processing of the loop A, the satellite signal capturing unit 271 performs processing of a loop B for each reception data set (Steps A5 to A13).

In the processing of the loop B, the satellite signal capturing unit 271 outputs the output control signal of data to the sample memory 210 (Step A7). The output control signal is an instruction signal of a data read position. The sample memory 210 outputs the sampling values of the reception data set stored at the instructed read position to the carrier removing unit 220 in response to the output control signal from the satellite signal capturing unit 271.

Next, the satellite signal capturing unit 271 instructs the carrier removing unit 220 to remove carriers (Step A9). Specifically, the Doppler frequency concerning the capturing-target satellite is output to the carrier removing unit 220 to generate a carrier removing signal. The carrier removing unit 220 generates the carrier removing signal in accordance with an instruction from the satellite signal capturing unit 271, and multiplies the sampling values of the carrier removing signal to the sampling values output from the sample memory 210.

Next, the first addition-subtraction unit 230 performs first addition-subtraction of k sampling values output from the carrier removing unit 220 while changing the combinations of addition and subtraction (Step A10).

Next, the satellite signal capturing unit 271 outputs the write control signal of data to the buffer 240 (Step A11). The write control signal is an instruction signal of a data write position. The buffer 240 writes the addition-subtraction results concerning the reception data set output from the first addition-subtraction unit 230 to the instructed write position in response to the write control signal from the satellite signal capturing unit 271. The satellite signal capturing unit 271 performs the processing of Steps A7 to A11 for all of the reception data sets (Step A13).

Thereafter, for each of the replica offsets of the code values of the replica codes of the capturing-target satellite from among the replica code data 293 stored in the storage unit 290, the satellite signal capturing unit 271 executes processing of a loop C (Steps A15 to A31). In the processing of the loop C, the satellite signal capturing unit 271 executes processing of a loop D for each reception data set (Steps A17 to A27).

In the processing of the loop D, the satellite signal capturing unit 271 outputs the output control signal of data to the buffer 240 (Step A19). The buffer 240 outputs the first addition-subtraction results of the reception data set stored at the read position instructed by the output control signal to the second addition-subtraction unit 250.

Next, the second addition-subtraction unit 250 performs the second addition-subtraction of the first addition-subtraction results concerning the reception data set output from the buffer 240 while changing the combinations of addition and subtraction (Step A20).

Next, the satellite signal capturing unit 271 determines a combination of positive and negative signs of the code values of the replica data set corresponding to the reception data set (Step A21). The satellite signal capturing unit 271 selects the second addition-subtraction result of the same combination as the determined combination of positive and negative signs from the addition-subtraction results of the second addition-subtraction unit 250 (Step A23). The satellite signal capturing unit 271 stores the selected addition-subtraction result in the product value data 294B of the satellite signal capturing data 294 as the product value concerning the reception data set of the replica offset (Step A25), and progresses the processing to the next reception data set.

After the processing of Steps A19 to A25 is performed for all of the reception data sets, the satellite signal capturing unit 271 ends the processing of the loop D (Step A27). Thereafter, the satellite signal capturing unit 271 totals the product values concerning all of the reception data sets of the replica offset stored in the product value data 294B of the satellite signal capturing data 294 to calculate the correlation value, and stores the correlation value in the correlation value data 294C (Step A29). The satellite signal capturing unit 271 progresses the processing to the next replica offset.

After the processing of Steps A17 to A29 is performed for all of the replica offsets, the satellite signal capturing unit 271 ends the processing of the loop C (Step A31). Thereafter, the satellite signal capturing unit 271 determines the code phase on the basis of the replica offset corresponding to the maximum correlation value from among a plurality of correlation values stored in the correlation value data 294C, and stores the code phase in the measurement data 295 of the storage unit 290 (Step A33). The satellite signal capturing unit 271 progresses the processing to the next capturing-target satellite.

After the processing of Steps A5 to A33 is performed for all of the capturing-target satellites, the satellite signal capturing unit 271 ends the processing of the loop A (Step A35). The satellite signal capturing unit 271 ends the satellite signal capturing processing.

2-1-6. Functional Effect

According to this example, in the baseband processing circuit unit 20, every four sampling values of the sampling values in a time series obtained by sampling the reception signals from the GPS satellites stored in the sample memory 210 are selected. In the first addition-subtraction unit 230, addition-subtraction of the selected four sampling values is performed while changing the combinations of addition and subtraction. At this time, the first addition-subtraction is performed while the combinations of addition and subtraction of the sampling values are changed in each of two groups of the four sampling values in two sampling values. The computation results of the first addition-subtraction unit 230 are stored in the buffer 240. For the first addition-subtraction results of each group stored in the buffer 240, in the second addition-subtraction unit 250, the second addition-subtraction is performed while changing the combinations of addition and subtraction. The second addition-subtraction results become the addition-subtraction results of the four sampling values.

If the addition-subtraction results of the four sampling values are obtained in this way, the processing unit 270 calculates the correlation values of the reception signals and the replica codes using the addition-subtraction results of a combination corresponding to time-series change in the code values of the replica codes from among the combinations of addition and subtraction. The processing including the calculation of the correlation values is performed while changing the correlation calculation position (replica offset) of the code values of the replica codes, and the code phase of the reception signal is determined on the basis of the correlation calculation position corresponding to the maximum correlation value from among a plurality of calculated correlation values.

According to the method of this example, addition-subtraction of every four selected sampling values of the reception signals is performed while changing the combinations of addition and subtraction. By a simple method which selects the addition-subtraction results of a combination corresponding to time-series change in the code values of the replica code, the correlation values of the reception signals and the replica codes can be calculated. That is, since the correlation values can be calculated without multiplication, the circuit scale can be significantly reduced. The amount of computation by software can be significantly reduced. The reduction in the circuit scale or the amount of computation leads to reduction in power consumption.

In the method of this example, since the computation results of the first addition-subtraction unit 230 are stored in the buffer 240, it is not necessary to execute the first addition-subtraction having the same computation results many times, thereby realizing correlation computation with a smaller amount of computation.

2-2. Second Example

A second example is an example where the addition-subtraction results of the second addition-subtraction unit 250 in the example of the mobile phone 1 are stored in a second buffer (second storage unit) 260, and the processing unit 270 reads the second addition-subtraction results from the second buffer 260 to calculate the correlation values. The configuration of the mobile phone 1 is the same as in the first example, thus overlapping description will not be repeated.

2-2-1. Method of Calculating Correlation Value

Figure 8:
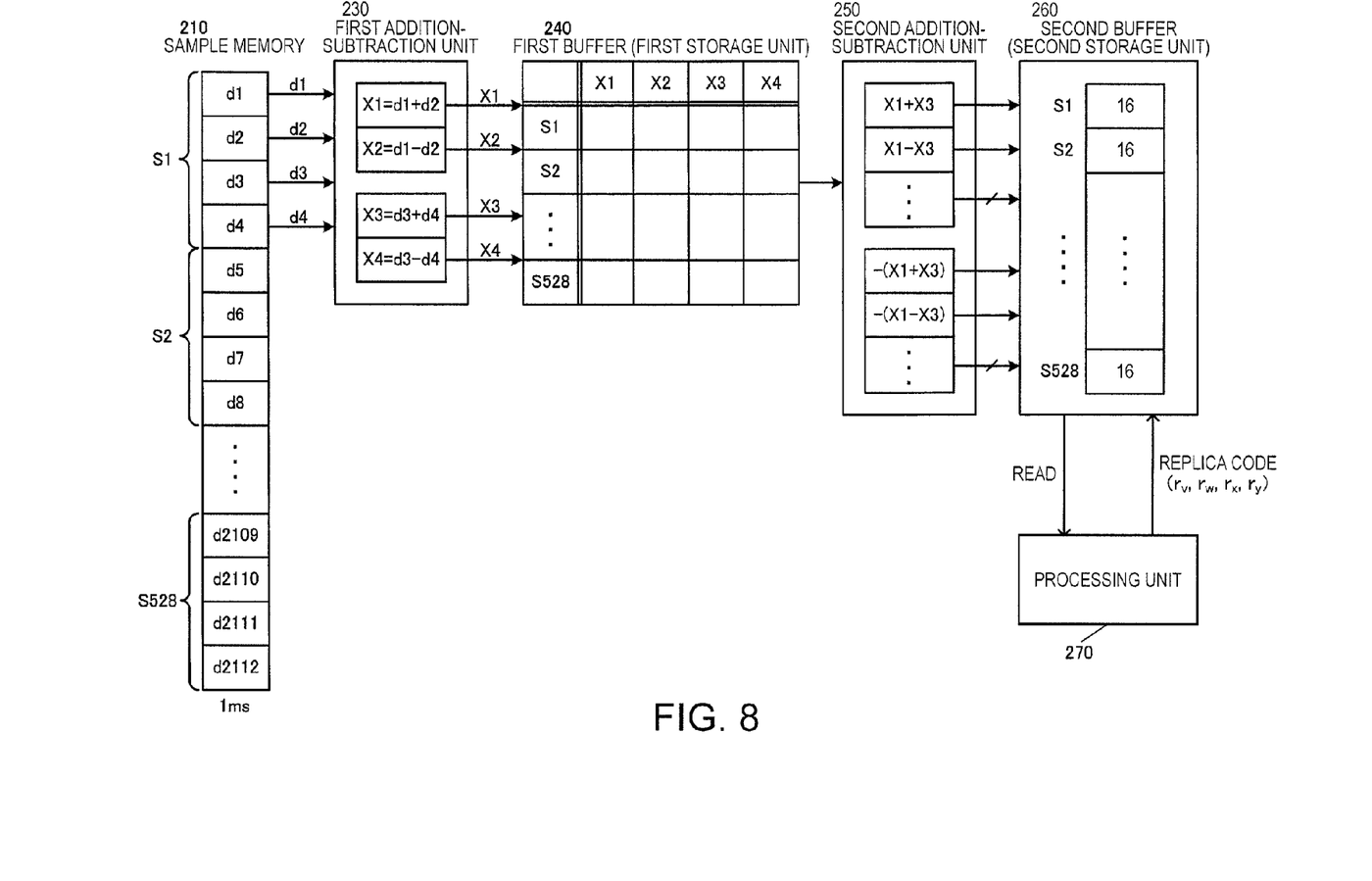
FIG. 8 is an explanatory view of a method of calculating a correlation value in a second example.

FIG. 8 is an explanatory view of a method of calculating a correlation value in the second example. As in FIG. 5, a case where every four sampling values of the sampling values of the reception signals are selected to generate the reception data sets. The computation results (first addition-subtraction results) of the first addition-subtraction unit 230 are stored in a first buffer (first storage unit) 240. That is, for each reception data set, the addition-subtraction results "X1 to X4" of two groups are stored in the first buffer 240.

Next, the second addition-subtraction unit 250 performs the second addition-subtraction on the basis of the first addition-subtraction results output from the first buffer 240. With the second addition-subtraction of the second addition-subtraction unit 250, for each reception data set, 16 addition-subtraction results are obtained. The 16 addition-subtraction results are stored in the second buffer (second storage unit) 260. The processing unit 270 reads the addition-subtraction result corresponding to time-series change in the four code values of the replica codes from the second buffer 260 to calculate the correlation values.

2-2-2. Flow of Processing

Figure 9:
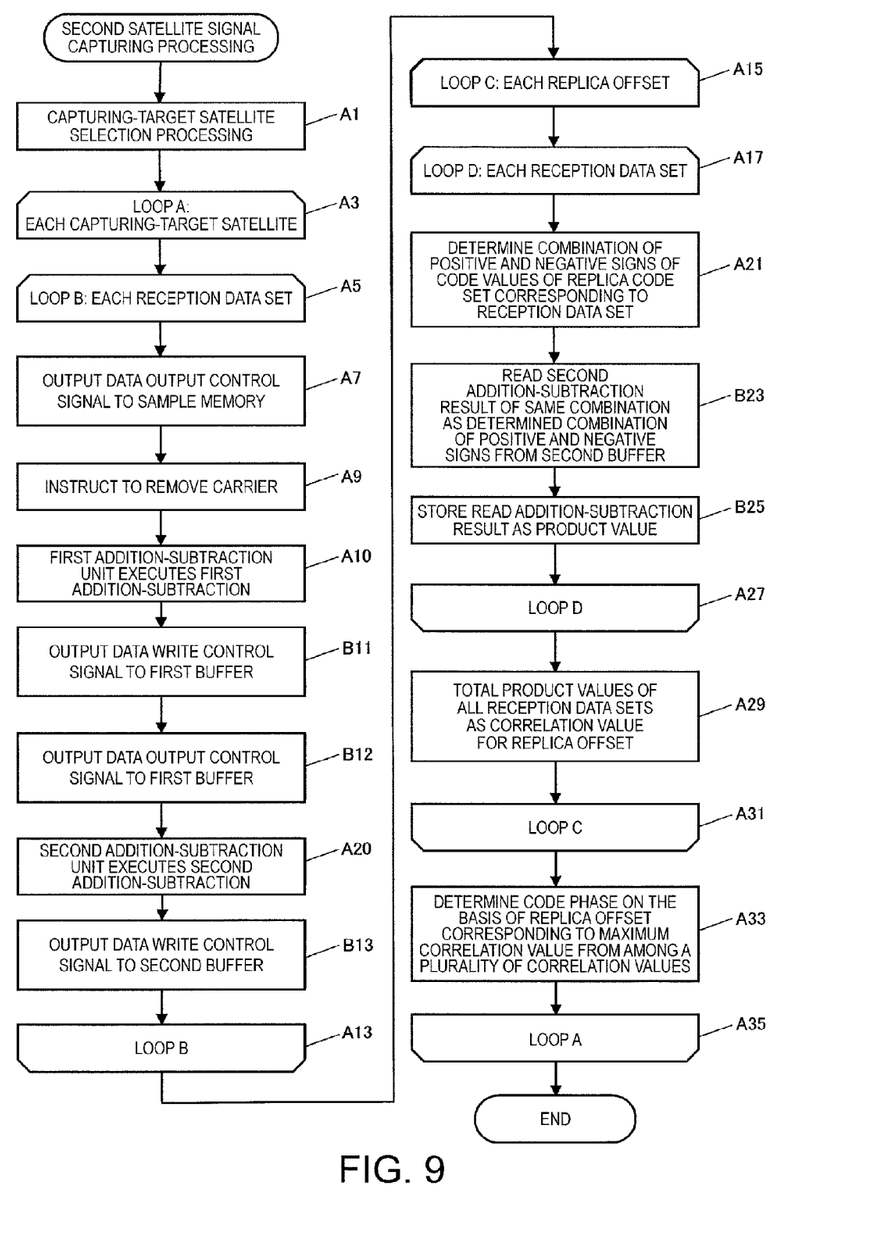
FIG. 9 is a flowchart showing the flow of second satellite signal capturing processing.

FIG. 9 is a flowchart showing the flow of second satellite signal capturing processing which is executed by the processing unit 270 of the baseband processing circuit unit of the foregoing example instead of the satellite signal capturing processing of FIG. 7. The same steps as in the satellite signal capturing processing are represented by the same reference numerals, and overlapping description will not be repeated.

In the processing of the loop B for each reception data set, after an instruction to remove carriers is issued in Step A9, the first addition-subtraction unit 230 performs the first addition-subtraction of k sampling values output from the carrier removing unit 220 while changing the combinations of addition and subtraction (Step A10).

Thereafter, the satellite signal capturing unit 271 outputs the write control signal of data to the first buffer 240 (Step B11). The first buffer 240 writes the first addition-subtraction results concerning the reception data set to the write position instructed by the write control signal.

Thereafter, the satellite signal capturing unit 271 outputs the output control signal of data to the first buffer 240 (Step B12). The first buffer 240 reads the first addition-subtraction results concerning the reception data set from the read position instructed by the output control signal and outputs the first addition-subtraction results to the second addition-subtraction unit 250.

Next, the second addition-subtraction unit 250 performs the second addition-subtraction of the first addition-subtraction results concerning the reception data set output from the first buffer 240 while changing the combinations of addition and subtraction (Step A20).

Thereafter, the satellite signal capturing unit 271 outputs the write control signal of data to the second buffer 260 (Step B13). The second buffer 260 writes the second addition-subtraction results concerning the reception data set to the write position instructed by the write control signal. Accordingly, for the reception data set, 16 addition-subtraction results are written in the second buffer 260.

If the processing of Steps A7 to B13 is performed for all of the reception data sets, for each reception data set, 16 addition-subtraction results are written in the second buffer 260.

In the processing of the loop C and the loop D for each replica offset and each reception data set, the satellite signal capturing unit 271 determines a combination of positive and negative signs of the code values of the replica data set corresponding to the reception data set (Step A21). The second addition-subtraction result of the same combination as the determined combination of positive and negative signs is read from the second buffer 260 (Step B23). The read addition-subtraction result is stored in the product value data 294B of the satellite signal capturing data 294 as the product value (Step B25).

In the method of the second example, since the computation results of the second addition-subtraction unit 250 are stored in the second buffer 260, it is not necessary to execute the second addition-subtraction having the same computation results many times, thereby realizing correlation computation with a smaller amount of computation.

3. Modifications

The examples to which the invention can be applied are not limited to the foregoing examples, and may be of course appropriately changed without departing from the scope of the invention. Hereinafter, modifications will be described.

3-1. Value of k

In the above description of the principle, an example where every two sampling values of the sampling values of the reception signals are selected to generate the reception data sets has been described. In the foregoing examples, an example where every four sampling values of the sampling values of the reception signals are selected to generate the reception data sets has been described. However, the value of k when every k sampling values of the sampling values of the reception signals are selected is not limited to these values, and may be of course appropriately selected.

When k is equal to or greater than 4, and addition-subtraction is performed for two groups in k sampling values, computation may be performed with the same number of sampling values between the first group and the second group, or computation may be performed with different numbers of sampling values between the first group and the second group. For example, when "k=5", the number of sampling values included in the first group may be "2", and the number of sampling values included in the second group may be "3".

3-2. Integration of Reception Signals

Although in the foregoing embodiment, a case where addition-subtraction is performed on the sampling values for 1 millisecond stored in the sample memory has been described, the sampling values for 1 millisecond or more may be stored in the sample memory.

For example, the sampling values of the reception signals for 10 milliseconds are stored in the sample memory. Since data for 1 millisecond is sampled to 2112 pieces, 2112×10 sampling values are accumulated and stored in the sample memory. 1 millisecond corresponds to one C/A code period. Accordingly, the sampling values with the same phase (sample timing) are integrated.

That is, 10 sampling values at the same sample timing from among sampling values for 1 millisecond ten times of the first 1 millisecond, the next 1 millisecond, and the subsequent 1 millisecond are integrated. As a result, the integrated values become 2112 values with the phase (sample timing) changed. The integrated values are used as the sampling values of the foregoing embodiment. This method is useful in the weak electric field environment so as to improve sensitivity.

3-3. Presence/Absence of Buffer

Although in the first example, the computation results of the first addition-subtraction unit 230 may be stored in the buffer 240, the buffer 240 may not be provided. That is, the computation of the first addition-subtraction unit 230 may be performed each time correlation processing is performed. Although in the second example, a configuration in which the computation results of the second addition-subtraction unit 250 are stored in the second buffer 260 has been made, similarly to the buffer 240, the second buffer 260 may not be provided.

3-4. Presence/Absence of Output Control Signal and Write Control Signal of Data Although in the first example, a configuration in which the output control signal of data is output to the sample memory 210, and the write control signal and the output control signal of data are output to the buffer 240 has been made, the output control signal and the write control signal of data may not be provided. Although in the second example, a configuration has been made in which the output control signal of data is output to the sample memory 210, the write control signal and the output control signal of data are output to the first buffer 240, and the write control signal of data is output to the second buffer 260, as in the first example, the output control signal and the write control signal of data may not be provided.

3-5. Electronic Apparatus

Although in the foregoing examples, a case where the invention is applied to a mobile phone as a type of electronic apparatus has been described, an electronic apparatus to which the invention can be applied is not limited thereto. For example, the invention may be applied to other electronic apparatuses, such as a car navigation device, a portable navigation device, a personal computer, a PDA (Personal Digital Assistant), and a wristwatch.

3-6. Satellite Positioning System

Although in the foregoing embodiment, an example where the GPS is used as a satellite positioning system has been described, a different satellite positioning system, such as WAAS (Wide Area Augmentation System), QZSS (Quasi Zenith Satellite System), GLONASS (GLObal NAvigation Satellite System), or GALILEO, may be applied.

What is claimed is:

1. A method of acquiring a satellite signal, the method comprising:
  - selecting every k (k≥2) sampling values from sampling values in a time series obtained by sampling a reception signal from a satellite;
  - performing addition-subtraction of the selected k sampling values by changing combinations of addition and subtraction;
  - calculating a correlation result of the reception signal and a replica code using the addition-subtraction results of a combination corresponding to time-series change in code values of the replica code from among the combinations of addition and subtraction; and acquiring the satellite signal of the satellite using the correlation result.

2. The method of acquiring a satellite signal according to claim 1, wherein the calculating of the correlation result includes changing a correlation calculation position of the code values of the replica code and calculates the correlation result using the addition-subtraction results of a combination corresponding to time-series change from the correlation calculation position of the code values of the replica code, and the acquiring of the satellite signal includes determining a code phase based on the correlation calculation position corresponding to a maximum correlation value from among a plurality of correlation values calculated by changing the correlation calculation position.

3. The method of acquiring a satellite signal according to claim 1, wherein k is equal to or greater than 4, the performing of the addition-subtraction includes dividing the k sampling values into two groups, performing first addition-subtraction of sampling values in each of the groups by changing the combinations of addition and subtraction, and performing second addition-subtraction of the first addition-subtraction results by changing the combinations of addition and subtraction between the groups, and the second addition-subtraction results are set as the addition-subtraction results of the k sampling values.

4. The method of acquiring a satellite signal according to claim 3, further comprising:

storing the first addition-subtraction results of each group in a first storage unit, wherein the performing of the second addition-subtraction includes performing the second addition-subtraction using the first addition-subtraction results stored in the first storage unit.

5. The method of acquiring a satellite signal according to claim 4, wherein, in the performing of the second addition-subtraction, an addition-subtraction unit performs the second addition-subtraction using the first addition-subtraction results stored in the first storage unit when calculating the correlation result, and the calculating of the correlation result selects an addition-subtraction result corresponding to time-series change in the code values of the replica code from among the addition-subtraction results of the addition-subtraction unit and calculates the correlation result.

6. The method of acquiring a satellite signal according to claim 4, further comprising:

storing the second addition-subtraction results in a second storage unit, wherein the calculating of the correlation result reads an addition-subtraction result corresponding to time-series change in the code values of the replica code from the second storage unit and calculates the correlation result.

7. A device for acquiring a satellite signal, the device comprising:

a selection control unit which performs control to select every k (k≥2) sampling values from sampling values in a time series obtained by sampling a reception signal from a satellite;

an addition-subtraction unit which performs addition-subtraction of the selected k sampling values by changing combinations of addition and subtraction;

a correlation result calculation unit which calculates a correlation result of the reception signal and a replica code using the addition-subtraction results of a combination corresponding to time-series change in code values of the replica code from among the combinations of addition and subtraction; and an acquiring unit which acquires the satellite signal of the satellite using the correlation result.

* * * * *